Figure 1:
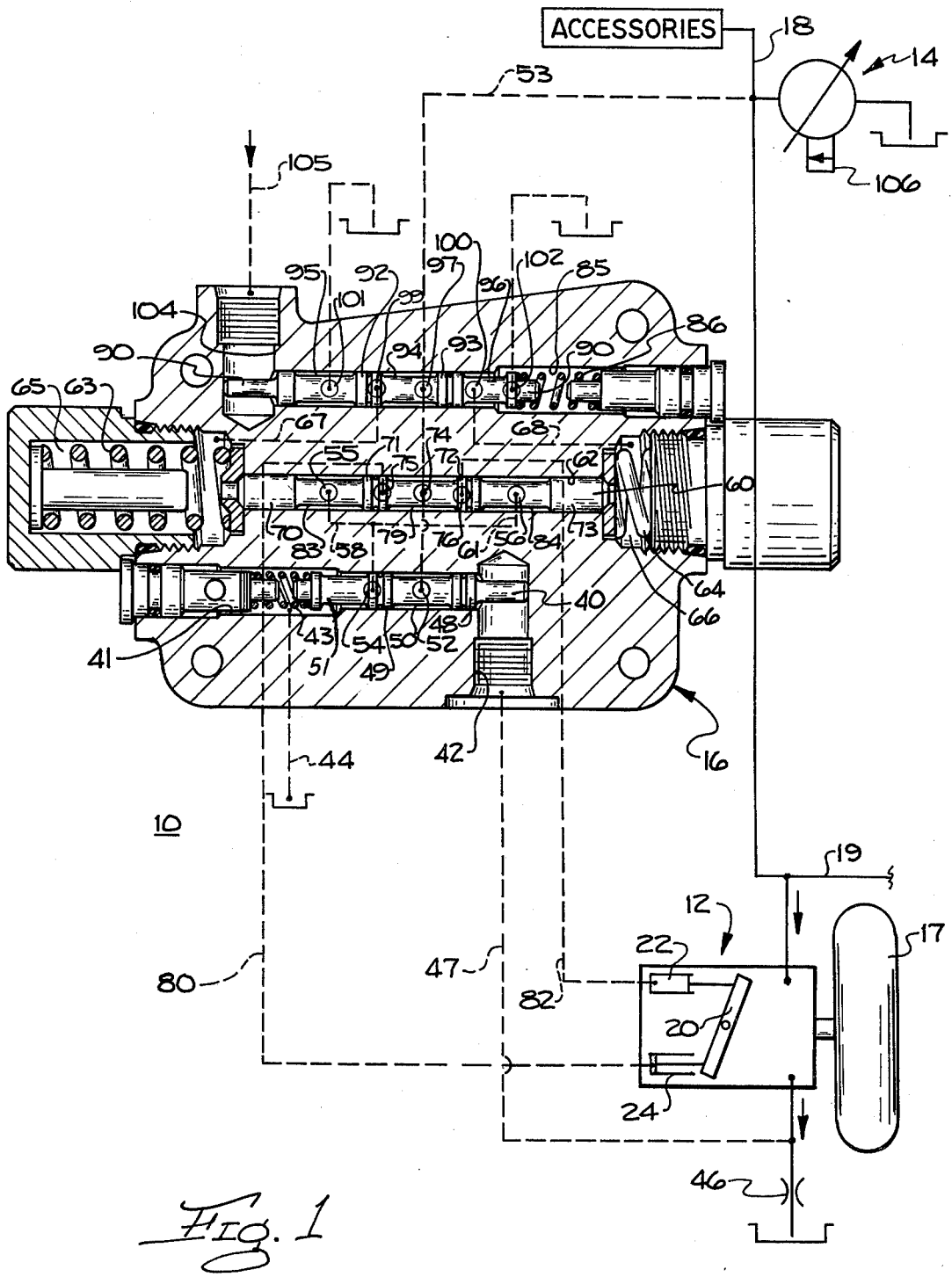

United States Patent [19]
Alderson

[11] B 3,984,978
[45] Oct. 12, 1976

[54] AUXILIARY FRONT WHEEL DRIVE

[75] Inventor: Loren L. Alderson, Hutchinson, Kans.

[73] Assignee: The Cessna Aircraft Company, Hutchinson, Kans.

[22] Filed: Nov. 22, 1974

[21] Appl. No.: 526,445

[44] Published under the second Trial Voluntary Protest Program on January 20, 1976 as document No. B 526,445.

[52] U.S. Cl................................. 60/422; 60/445;
60/450; 180/44 M; 60/698
[51] Int. Cl.²......................................... F16H 39/46
[58] Field of Search ............ 60/420, 422, 445, 448,
60/450, 451, 487, 490, 698, 716, 717;
180/44 M, 44 F, 44 R

[56] References Cited
UNITED STATES PATENTS

| | | | |
|---|---|---|---|
| 3,339,660 | 9/1967 | Budzich | 60/420 X |
| 3,354,978 | 11/1967 | Budzich | 60/427 X |

*Primary Examiner*—Edgar W. Geoghegan

[57] ABSTRACT

An auxiliary hydraulic front wheel drive including a pair of variable displacement pressure and flow compensated motors each connected to individual wheels; the auxiliary drive utilizes a pressure compensated pump source of the existing hydraulic system on the vehicle. The primary accessories run by said pump maintain a priority flow over the auxiliary drive motors since the pressure compensating level of the motors is set slightly below that of the pump.

8 Claims, 2 Drawing Figures

AUXILIARY FRONT WHEEL DRIVE

BACKGROUND OF THE INVENTION

While the particular invention has specific application to motor graders, it could also be used on other vehicles having a need for four-wheel traction. The general concept of an auxiliary hydraulic front wheel drive working in conjunction with a conventional mechanical transmission which provides the primary drive is well known in the art as exemplified in U.S. Pat. Nos. 3,354,978 and 3,339,660. Most of these auxiliary systems previously taught in the prior art utilize a totally independent hydraulic system whereby the auxiliary system has its own pump source. The auxiliary system of the present invention makes use of a pump source from another system, more specifically, it utilizes the pump source used to power the conventional hydraulically driven accessories on the vehicle. In the specific application of a motor grader, these accessories would include the various power assists for braking, steering and the various cylinders for positioning the scraper blade. Since the pump source in modern variable displacement systems comprises the heart of the system, the elimination of a pump source on a system has its obvious economic advantages.

SUMMARY OF THE PRESENT INVENTION

The auxiliary drive system of the present invention comprises a pair of variable displacement axial piston motors, each directly connected to a front wheel of the vehicle, the motors being pressure and flow compensated and driven from the pressure compensated pump of the existing accessory system on the vehicle. The motors would be pressure compensated at a level slightly below the pressure compensating level of the primary system pump. This would allow the pump to stroke to full displacement, depending upon its various demands from the accessories and the auxiliary system before destroking of the motors begins. As the flow demands exceed the maximum output of the pump, the system pressure drops below the pressure compensating level of the pump and the pressure compensators on the motors begin to destroke. The motors would destroke only the amount required to maintain their specific pressure level slightly below that of the pump, thereby giving priority flow to the accessory system. As the accessory system uses more of the pump output, the wheel motors would decrease even further to maintain their pressure level, which would decrease the torque output of the auxiliary drive but at all times utilizing all of the power available at the system pump. The particular application of the present invention is in a motor grader with the auxiliary system powering the remotely positioned front wheels. The invention would also have application with a single variable displacement motor driving the front wheels through a differential. While the auxiliary system, even at maximum torque is not sufficient to move the vehicle, it substantially improves the performance of the grader on a side slope. With even a small amount of torque on the front wheels, the grader can grade on a fairly steep side slope without the front of the vehicle sliding downhill. Torque on the front wheels would also be equally beneficial while plowing snow.

The pressure compensated wheel motors also have a flow compensating control whereby if the flow level through the motors exceeds a prearranged rate, the motor swash plate will begin to destroke and maintain a constant flow rate. If one of the auxiliary wheels happens to lose traction and overspeed, the flow control would destroke the motor until traction was regained or the prearranged flow level was attained.

It is therefore the principal object of the present invention to provide an auxiliary hydraulic drive for the wheels of a self-propelled vehicle, the auxiliary drive being powered from a separate hydraulic system.

Another object of the present invention is to provide an auxiliary hydraulic drive powered from a pump of another system with the other system maintaining priority flow as to the pump's output over the auxiliary drive system.

Another object of the present invention is to provide an improved combined mechanical and hydraulic drive system for an earth-moving motor grader.

Figure 2:
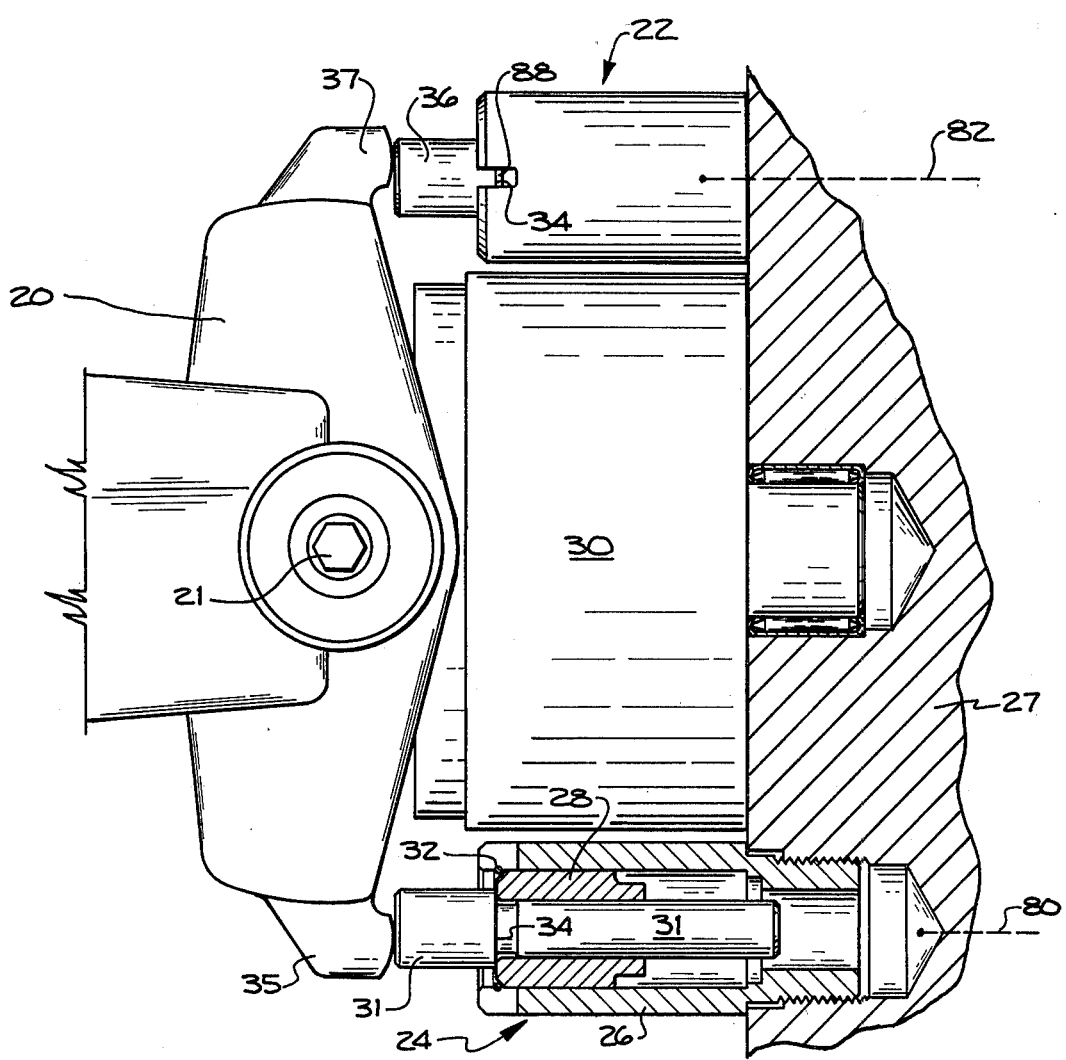

Further objects and advantages of this invention will become apparent from the following description and drawings in which:

FIG. 1 is a sectional view through the motor control with the remainder of the system shown schematically; and FIG. 2 is a partial sectional view of the motor reversing structure with one of the control cylinders shown in longitudinal section.

Although the invention has broader applications, it will be described hereinafter in specific relation to a motor grader which presently constitutes the preferred use.

Referring now to the drawings in detail, and more specifically to FIG. 1; the auxiliary hydraulic drive system generally identified by reference numeral 10, is made up of a variable displacement axial piston motor 12 driven by a pressure compensated variable displacement pump 14, the motor 12 being controlled by a pressure flow compensating control 16. The pressure compensated pump 14 principally drives the various accessories on the vehicle through line 18 which are not shown in detail since they are not a part of the present invention. These accessories would include such things as the power steering and linear motors utilized to position the scraping blade. The variable displacement pump 14 is directly driven off the prime mover of the vehicle which is also not shown.

Connected to each front wheel 17 of the motor grader is the variable displacement motor unit 12. While the drawing only shows a single wheel 17 and motor 12, the system in fact includes a pair of identical motors, one for each front wheel, connected in parallel to pump 14. Since the second motor and its respective controls are identical, they have not been shown; however, the second motor would be supplied with pump pressure through line 19. The motor swash plate 20 is symbolically illustrated along with its two control cylinders 22 and 24.

The detailed structure of motor 12 is not shown since an axial piston pump or motor is common knowledge in the art. In FIG. 2, the motor swash plate 20 is shown in detail pivotally mounted on a trunion 21 for movement off its dead center position in either direction, since the motor is reversible. Positioned on opposite sides of cylinder block 30 are a pair of control cylinders 22 and 24 which position the swash plate 20. Control cylinder 24 includes a cylinder sleeve 26 threadably received into the end plate 27 of the motor 12. Slidably positioned in sleeve 26 is a two-stage telescoping piston structure including a first stage sleeve piston 28 and a second stage piston pin 31. The outward stroke of the first stage 28 is limited to the dead center position, as seen in the drawing, by snap ring 32 which extends outwardly from a groove in sleeve 26. Second stage pin 31 is enlarged at its outer end, forming a shoulder 34 which stops against the first stage sleeve piston 28. The outer end of pin 31 contacts the swash plate 20 at boss 35 for movement of the swash plate in a clockwise direction. Control cylinder 22, not shown in detail since it is identical to cylinder 24, includes a second stage piston pin 36 which contacts swash plate boss 37 for movement of the swash plate in a counter-clockwise direction. In viewing control cylinder 24, it can be seen that the effective piston area for any additional extension would be only the cross sectional area of pin 31. If pin 31 was positioned to the right of its position shown in FIG. 2, the effective area of the piston assembly would include not only piston pin 31 but also sleeve piston 28, since sleeve piston 28 had not reached its snap ring stop 32. The position shown in FIG. 2 of the swash plate is considered the dead center position with the effective areas of both control cylinders 22 and 24 being the same, which is the reduced area of the pin 31. At any time when the swash plate is positioned in either direction off the dead center position, the effective areas of the pistons within cylinders 22 and 24 are no longer equal with the retracted piston having the additional effective area of its first stage member 28. To bring the swash plate to a dead center neutral position, it is only required to pressurize both cylinders, thereby causing the swash plate to return to neutral in light of the increased force caused by the pistons of the retracted cylinder.

The motor control unit 16, shown in FIG. 1, includes a flow control spool 40, a pressure control spool 60 and a forward and reverse spool 90. Flow control spool 40 is located in bore 41. Flow control spool 40 is biased to the right by spring 43, with the end of the spool 40 contacting the far side of bore 42. The left hand end of bore 41 which encompasses spring 43 is connected to drain via line 44. While the left hand end of spool 40 is exposed to atmospheric pressure, the right hand end of spool 40 in cross bore 42 is exposed to motor discharge pressure upstream from orifice 46 via sensing line 47. Spool 40 senses the pressure drop across orifice 46 at opposite ends of the spool as in a conventional flow control spool. Flow control spool 40 includes lands 48 and 49, and grooves 50 and 51. Intersecting spool bore 41 is sensing passage 52 which is connected to pump pressure via sensing line 53. Sensing passage 54 is connected in parallel to sensing passages 55 and 56 of the pressure compensating spool 60 through sensing lines 58 and 61.

The pressure compensating control spool 60 is positioned in bore 62 with compression springs 63 and 64 on opposite ends of the spool biasing the spool into a no-pressure position as seen in the drawing. The spring cavity chambers 65 and 66, which also act as servo chambers, are alternately connected to either drain or pump pressure, depending upon the direction in which the motor is being operated via sensing lines 67 and 68. Pressure compensating spool 60 includes lands 70, 71, 72 and 73. Intersecting bore 62 is sensing passage 74 connected to the pump discharge via sensing line 53. Also intersecting bore 62 on opposite sides of passage 74 are sensing passages 75 and 76 which connect to control cylinders 24 and 22 respectively via sensing lines 80 and 82. Pressure compensating spool 60 in its zero-pressure position, as shown in the drawing, permits pump pressure from passage 74 to pass via spool groove 79 to passages 75 and 76 to equally charge control cylinders 24 and 22 respectively.

Forward and reversing spool 90 is positioned in bore 85 with compression spring 86 urging the spool to the left to its forward position as seen in the drawing. Spool 90 includes lands 92 and 93 separated by groove 94 and adjacent grooves 95 and 96. Intersecting valve spool bore 85 is sensing passage 97 connected to pump discharge pressure via sensing line 53. Positioned on opposite sides of sensing passage 97 and intersecting bore 85 are sensing passages 99 and 100 which connect to servo chambers 65 and 66 respectively via sensing lines 67 and 68. Also intersecting bore 85 are drain passages 101 and 102. The left hand end of forward and reverse spool 90 is exposed to the pressure in cross bore 104 in opposition to spring 86.

OPERATION

Forward and reversing spool 90 is remotely actuated via line 105 by either pressurizing line 105 or draining same. As shown in the drawing, spool 90 is in the forward position to the far left with no pressure in cross bore 104. The function of forward and reversing spool 90 is to permit pump pressure to be experienced on one end or the other of pressure compensating spool 60 while draining the opposite end. In the forward position, as seen in the drawing, the output pressure of pump 14 is experienced in left servo chamber 65 via sensing line 67, passage 99, groove 94, passage 97 and sensing line 53. Servo chamber 66 on the opposite end of the pressure compensating spool 60 is connected to drain via sensing line 68, passage 100, groove 96 and passage 102. Due to the action of spring 86, whenever the actuating pressure in line 105 is relaxed, the forward and reversing spool will move to the left, as seen in the drawing, connecting pressure passages 99 and 97, and drain passages 100 and 102.

When it is desired to reverse the direction of motor 12, pressure is supplied in line 105 causing spool 90 to retract against spring 86 which connects pressure passage 97 with passage 100 while cutting passage 100 off from drain, and passage 99 is connected with drain passage 101. This in effect pressurizes the opposite servo chamber 66 via line 68, passage 100, groove 94, passage 97 and sensing line 53, while draining servo chamber 65. Pressure compensating spool 60 now experiences pressure on its right end compressing spring 63 with the movement of the spool to the left. This movement maintains pump pressure in control cylinder 24 while land 72 cuts off pump pressure to passage 76 and opens passage 76 to drain passage 56. However, this normal or adequate pressure position will not alone increase the stroke of the motor since drain passage 56 must also be open through passage 54 to drain, as illustrated in FIG. 1. In other words, not only must you have an adequate pressure condition to increase the stroke of the motor but also an insufficient flow condition.

The pressure compensating spool 60 in a no-pressure situation is positioned as seen in the drawing, with sensing passage 74 open to both sensing passages 75 and 76 which are not completely covered by respective lands 71 and 72. By pressurizing passages 75 and 76, the control cylinders 22 and 24 via sensing lines 82 and 80 are pressurized equally, thereby causing swash plate 21 to return to its neutral dead center position as viewed in FIG. 2. In this position, the wheels 17 are essentially decoupled from the auxiliary drive system 10 since the motor displacement is zero. Control cylinders 22 and 24, when equally pressurized, will move to the dead center position since the effective piston area of one of the cylinders will be greater than that of the other. For example, let's assume the swash plate 20, in FIG. 2, is rotated in a counter-clockwise direction from that shown in the drawing, with piston assembly 31 and 28 retracted to the right while piston 36 of the opposite control cylinder 22 is extended to the left in contact with boss 37. In this position, when equal pressures are applied to both control cylinders 22 and 24, the effective area of the piston of cylinder 24 will be substantially greater than that of the piston of cylinder 22 due to the fact that sleeve piston 28 has not reached its stop ring 32, thereby increasing the piston area of cylinder 24. This increased force on control cylinder 24 will overcome the lesser force in cylinder 22 which has a lesser effective area since its sleeve portion of the piston is already resting on its respective snap ring stop 88, thereby causing the swash plate 20 to return to the dead center position. Once the swash plate 20 reaches the dead center position with the pressures equalized in both cylinders 22 and 24, it will stop movement since the effective piston areas are now the same. This is caused by the fact that in both control cylinders 22 and 24 the sleeve portions 28 of the piston assemblies have reached their snap ring stops.

As pressure begins to build in the system 10, pressure compensating spool 60 will begin to move to the right, due to the system pressure being experienced in servo chamber 65. Initial movement will isolate any fluid flow to or from control cylinder 24 by reason of land 71 blocking passage 75. Further movement of spool 60 to the normal pressure compensating position will open passage 75 to drain passage 55, and if the flow control spool 40 is in the insufficient flow position, as seen in the drawing, a drain path is opened up to control cylinder 24, thereby increasing the stroke of the motor. Pressure compensating spool 60 functions in a similar manner when the vehicle direction is reversed except servo chamber 66 is pressurized while chamber 65 is connected to drain. Pressure in chamber 66 moves spool 60 to the left, controlling the flow of fluid to or from cylinder 24 by the movement of land 72 with regard to passage 76. Therefore a normal pressure indication and an insufficient flow indication are both necessary to drain cylinder 24 and increase the stroke of motor 12.

Whenever the flow requirements from either the auxiliary drive system or the accessories increase, the pressure compensating control 106 on pump 14 will cause the pump 14 to increase its stroke a sufficient amount so as to maintain the preset pressure compensating level of the pump. When the pump reaches its maximum stroke it can no longer maintain its pressure level and the pressure drops to the compensating level of the motor. As the pressure attempts to drop further, motor pressure compensating spool 60 begins to destroke the motors, thereby maintaining the pressure level so as to give priority flow to the accessories while reducing the torque output of the auxiliary system. The pressure compensating level of motor 12 is set slightly below that of pressure compensator 106 on the pump 14.

Flow control spool 40 normally spring-biased to the right, as seen in FIG. 1, senses the pressure drop across restriction 46 which is the discharge flow from motor 12. When the flow through motor 12 becomes excessive, the pressure drop across restriction 46 increases, overcoming spring 43 and shifting valve spool 40 to the left. Passage 54 which was previously open to drain via groove 51 is cut-off by land 49, thereby preventing either control cylinder 22 or 24 from draining. As land 49 moves further to the left, passage 54 is open to pump pressure via groove 50 and passage 52, thereby charging passages 55 and 56 with pump pressure. Assuming the pressure compensating spool 60 is in the adequate or excess pressure position, pump pressure will pass from either passage 55 or 56 to either passage 75 or 76, depending on the forward or reverse direction of the motor. This pressure in either passage 75 or 76 will cause motor swash plate 20 to destroke towards the zero flow position. The motor swash plate 20 will destroke with either an excess flow condition or an insufficient pressure condition. To increase the stroke of the motor, it is necessary to have both an excess or adequate pressure indication as well as an indication of insufficient flow, as previously discussed. To achieve priority flow to the accessories before the auxiliary drive, it is only necessary to have the pressure control on motor 12. The addition of the flow control to motor 12 adds the additional latitute in a loss of traction situation where the slipping wheel would overspeed. With a flow control, the slipping wheel would destroke reducing the torque output until traction was regained.

Having described the invention with sufficient clarity to enable those familiar with the art to construct and use it, I claim:

1. An auxiliary hydraulic drive system on a vehicle principally driven by other means, the vehicle having a primary hydraulic system including an engine driven variable displacement pressure compensated pump which supplies the various conventional accessories of the vehicle, the improvement comprising:
 a variable displacement motor having a pressure compensating control means connected in driving relation with the primary pump, the motor driving at least one non-mechanically driven wheel on the vehicle, the pressure compensator means on the motor being set at a pressure level less than the pressure compensating level on the primary pump; thereby destroking the motor when the system pressure drops below said lesser value, the lesser pressure compensating level of the motor being sufficient to supply the conventional accessories of the vehicle whereby said accessories have a priority requirement over the drive motor.

2. An auxiliary hydraulic drive system on a vehicle principally driven by other means, the vehicle having a primary hydraulic system including an engine driven variable displacement pressure compensated pump which supplies the various conventional accessories of the vehicle, the improvement comprising:
 a pair of variable displacement motors having a pressure compensating control means, the motors being connected in a parallel circuit with the primary pump, each motor driving an individual non-mechanically driven wheel on the vehicle, the pressure compensator means on the motors being set at a pressure level less than the pressure compensating level on the primary pump, thereby destroking the motor when the system pressure drops below said lesser value, the lesser pressure compensating level of the motor being sufficient to supply the conventional accessories of the vehicle whereby said accessories have a priority requirement over the drive motors.

3. An auxiliary hydraulic drive system as set forth in claim 2, including a flow control means on the variable displacement motors, the flow compensating means destroking the motors at a predetermined level less than the maximum speed of the vehicle.

4. An auxiliary hydraulic drive system on a vehicle principally driven by other means, the vehicle having a primary hydraulic system including an engine driven variable displacement pressure compensated pump which supplies the various conventional accessories of the vehicle, the improvement comprising:
a pair of variable displacement motors having flow and pressure compensating control means, the motors being connected in a parallel circuit with the primary pump, each motor driving an individual non-mechanically driven wheel on the vehicle, the flow compensator means of the motors destroking the motors at a predetermined level less than the maximum speed of the vehicle, the pressure compensator means on the motors being set at a pressure level less than the pressure compensating level on the primary pump, thereby destroking the motor when the system pressure drops below said lesser value, the lesser pressure compensating level of the motor being sufficient to supply the conventional accessories of the vehicle whereby said accessories have a priority requirement over the drive motors.

5. An auxiliary hydraulic drive system as set forth in claim 4, wherein the flow and pressure compensating control means coact with each other in a manner that either an excess flow condition or an insufficient pressure condition will destroke the variable displacement motors while to increase the stroke of the motors you must have both a condition of insufficient flow and excess pressure.

6. An auxiliary hydraulic drive system as set forth in claim 1, wherein the motor is a reversible axial piston motor having a swash plate control means including a pair of control cylinders, each cylinder is connected on opposite sides of the swash plate working in opposition to each other, each control cylinder including a two-stage telescoping piston with the effective area of the piston changing as the swash plate passes over dead center.

7. An auxiliary hydraulic drive system as set forth in claim 2, wherein the motors are reversible axial piston motors having a swash plate control means including a pair of single acting control cylinders, each cylinder being connected to opposite sides of the swash plate working against each other; each control cylinder including a two-stage telescoping piston, the first stage having a greater effective area ending at the dead center position of the swash plate, the swash plate control means further including valving means directing system pressure to one or both of the control cylinders in one position and draining one of said control cylinders in the other position.

8. In an auxiliary hydraulic drive system as set forth in claim 1, wherein the motor is a reversible axial piston motor having a swash plate control means including a pair of control cylinders, each cylinder being connected to opposite sides of the swash plate working against each other, each control cylinder including a two-stage telescoping piston, the first stage having a greater effective area ending at the dead center position of the swash plate; the pressure compensator control means on the motor includes:
a valve means;
first and second pilot servo means at opposite ends of the valve means, biasing means urging the valve means toward a neutral position; when the motor is moving in a forward direction, system pressure is exposed to the first pilot servo acting against the biasing means with second servo drained, for reverse movement of the motor, system pressure is exposed to the second pilot servo acting against the biasing means, the valve means having a deficient pressure position opening system pressure to both control cylinders and destroking the motor; the valve means having an optimum pressure position which drains one of the control cylinders and increases the motor's stroke.

* * * * *